United States Patent [19]
Cai et al.

[11] Patent Number: 5,952,436
[45] Date of Patent: Sep. 14, 1999

[54] PROCESS FOR MAKING WATER-RESISTANT POLYETHERESTER RESINS AND THERMOSETS

[75] Inventors: Gangfeng Cai, West Chester; Jeffrey A. Klang, Exton, both of Pa.; Lau S. Yang, Wilmington, Del.

[73] Assignee: Arco Chemical Technology, L.P., Greenville, Del.

[21] Appl. No.: 09/006,912

[22] Filed: Jan. 13, 1998

[51] Int. Cl.$^6$ .......................................... C08F 20/00
[52] U.S. Cl. ................... 525/438; 528/274; 528/275; 528/297; 528/300; 528/301; 528/302; 528/306; 525/437; 525/440; 525/445; 525/11; 525/41; 525/42; 525/43; 524/745; 524/779; 521/82
[58] Field of Search ............................... 528/274, 297, 528/300, 275, 301, 302, 306; 525/437, 438, 440, 445, 11, 41, 42, 43; 524/745, 779; 521/82

[56] References Cited

U.S. PATENT DOCUMENTS

| | | |
|---|---|---|
| 5,153,261 | 10/1992 | Brooks ........................................ 525/28 |
| 5,296,544 | 3/1994 | Heise et al. ................................. 525/28 |
| 5,319,006 | 6/1994 | Yang et al. ................................ 523/500 |
| 5,344,852 | 9/1994 | Brooks et al. ............................. 521/99 |
| 5,436,313 | 7/1995 | Klang et al. .............................. 528/274 |
| 5,436,314 | 7/1995 | Yang et al. ................................ 528/274 |
| 5,677,396 | 10/1997 | Klang ........................................ 525/445 |
| 5,696,225 | 12/1997 | Cai et al. ................................... 528/297 |

Primary Examiner—Samuel A. Acquah
Attorney, Agent, or Firm—Jonathan L. Schuchardt

[57] ABSTRACT

A general approach to making water-resistant polyetherester resins and thermosets is disclosed. In one aspect, an unsaturated polyetherester resin prepared by inserting a carboxylic acid derivative into a polyether is co-cured with a vinyl monomer and a di- or polyisocyanate to give a water-resistant, thermoset that has excellent dimensional stability, flexibility, and strength properties. Processes for making low-viscosity resins that give thermosets with good water resistance are also described. In one process, an unsaturated polyetherester resin intermediate reacts with a monofunctional isocyanate or fatty alcohol to produce an easy-to-formulate, low-viscosity, low-molecular-weight capped resin.

19 Claims, No Drawings

PROCESS FOR MAKING WATER-RESISTANT POLYETHERESTER RESINS AND THERMOSETS

FIELD OF THE INVENTION

The invention relates to polyetherester resins and thermosets. In particular, the invention is a process for making water-resistant polyetherester resins and high-performance thermosets from the resins. These products are especially useful in the composites industry.

BACKGROUND OF THE INVENTION

Recently, we described new processes for making polyetherester resins from polyethers (see U.S. Pat. Nos. 5,319,006, 5,436,313, and 5,436,314, and 5,677,396). In each process, a polyether reacts with a cyclic anhydride, a dicarboxylic acid, or a diol diester in the presence of an "insertion" catalyst. The anhydride, dicarboxylic acid, or diol diester inserts randomly into carbon-oxygen bonds of the polyether to generate ester bonds in the resulting polyetherester resin. The polyetherester resin is then combined with a vinyl monomer, preferably styrene, and is cured to produce a polyetherester thermoset. Lewis acids, protic acids having a pKa less than about 0, and metal salts thereof are effective insertion catalysts. The insertion process provides a valuable and versatile way to make many unique polyetherester intermediates.

More recently (see U.S. Pat. No. 5,696,225), we extended the insertion technology by developing a process for making high-performance polyetherester resins. These high-performance resins are made by chain-extending a polyetherester resin (made by insertion) with a primary diol or a diepoxy compound. The high-performance resins give thermosets with improved high-temperature performance, better tensile and flex properties, and enhanced resistance to aqueous solutions compared with those made using the earlier polyetherester resins. The thermosets are produced by reacting the unsaturated resin with a vinyl monomer. Unfortunately, high-performance polyetherester resins made by chain extension have relatively high molecular weights and viscosities, which can make formulating with them challenging. Preferably, good water resistance could be achieved with a low-viscosity, low-molecular-weight resin. In U.S. Pat. No. 5,696,225, we also described a way of making thermosets by co-curing the unsaturated polyetherester resin in the presence of both a vinyl monomer and a diepoxy compound (see, in particular, Examples 24–30 of the '225 patent). Co-curing the polyetherester resin in the presence of both a vinyl monomer and a diepoxy compound resulting in exceptional improvements in water resistance, especially flex strength retention following a six-day water-boil test.

While the co-curing process described above does give water-resistant thermosets, it has some limitations. First, diepoxy compounds react rapidly with carboxylic acid groups but more slowly with hydroxyl groups. Consequently, the polyetherester resin usually needs to have a relatively high acid number (at least about 40 mg KOH/g) to give a desirable curing profile. Second, the curing reaction of carboxylic acid groups with the diepoxy compound, which usually occurs at elevated temperature, can be challenging to coordinate with the low-temperature free-radical curing reaction. Finally, some diepoxy compounds are expensive. Preferably, water-resistant polyetherester thermosets could be made without the need to co-cure with diepoxy compounds.

Other known co-cured thermoset systems include "hybrid resin" systems such as those originally developed by Amoco Corporation under the Xycon trademark (see, e.g., U.S. Pat. Nos. 5,153,261, 5,296,544, and 5,344,852). These systems typically react a hydroxyl-terminated unsaturated polyester, a diisocyanate, and a vinyl monomer in the presence of a free-radical initiator. Other active hydrogen compounds are usually included. The unsaturated polyester resins are made by conventional condensation polymerization techniques. Hybrid resin systems offer advantages of polyester and polyurethane technologies. However, some of these hybrid systems lack adequate tensile and flexural strength properties. In addition, some hybrid systems require a resin having a very low acid number (<10 mg KOH/g). Preferably, good tensile and strength properties could be achieved with resins having higher acid numbers (e.g., 30 mg KOH/g or higher) while preserving the other advantages of hybrid resin systems.

Thermoset products with high thermal dimensional stability, commonly measured in terms of DTUL, are always in demand in the composites industry. Unfortunately, there are a limited number of ways to achieve high DTULs while maintaining adequate strength and flexibility.

In sum, the composites industry would benefit from new ways to make water-resistant thermosets. Preferably, good water resistance could be achieved with low-viscosity, low-molecular-weight resins instead of relatively high-molecular-weight, chain-extended resins. Valuable water-resistant thermosets would avoid the need to co-cure with diepoxy compounds. Moreover, the industry has a need for hybrid resin systems that have—in addition to good water resistance—improved flexibility and strength properties. Finally, there remains a need for plastics with good thermal dimensional stability (high DTUL) while maintaining good flexibility and strength.

SUMMARY OF THE INVENTION

The invention provides a general approach to making water-resistant polyetherester resins and thermosets. In one aspect, the invention is a two-step process for making a polyetherester thermoset. First, an unsaturated polyetherester resin is made by inserting a carboxylic acid derivative into a polyether. The resin is then co-cured with a vinyl monomer and a di- or polyisocyanate and to produce a water-resistant polyetherester thermoset. Water and/or other blowing agents can be included in the co-cure formulation to give cellular or microcellular products such as rigid foams.

The invention also includes processes for making low-viscosity resins that give thermosets with good water resistance. In one process, an unsaturated polyetherester resin intermediate is made from a polyether by insertion. The resin intermediate is then reacted with a mono-functional isocyanate or fatty alcohol to produce a low-viscosity capped resin that gives water-resistant thermosets having an excellent balance of physical properties.

The invention offers important advantages for the composites industry. Low-viscosity, low-molecular-weight resins are easier to formulate with than chain-extended alternatives. Good water resistance is achieved in a co-cured polyetherester resin system without a need to use diepoxy compounds. In addition, water-resistant, polyetherester thermosets made by the process of the invention offer flexibility and strength property advantages over previously known hybrid resin systems based on polyester resins. Finally, the invention provides thermosets with high DTUL without sacrificing other valuable mechanical properties.

DETAILED DESCRIPTION OF THE INVENTION

Water-resistant polyetherester thermosets of the invention are made by a two-step process. First, a carboxylic acid derivative is inserted into a polyether to give an unsaturated polyetherester resin. Co-curing this resin with a vinyl monomer and a di- or polyisocyanate gives the water-resistant thermoset.

Polyethers suitable for use in the invention derive from base or acid-catalyzed ring-opening polymerization of cyclic ethers such as epoxides, oxetanes, oxolanes, and the like, and mixtures thereof. The polyethers have oxyalkylene repeat units (—O—A—) in which A has from 2 to 10 carbon atoms, preferably from 2 to 4 carbon atoms. The polyethers can have different end groups, depending upon how the polyethers are made or modified. For example, the polyether can have hydroxyl, ester, ether, acid, or amino end groups, or the like, or combinations thereof. The polyethers can also incorporate other kinds of recurring units, such as ester groups. Mixtures of different types of polyethers can be used.

Preferred polyethers for use in the process of the invention are polyether polyols. Suitable polyether polyols include, for example, polyoxypropylene polyols, polyoxyethylene polyols, ethylene oxide-propylene oxide copolymers, polytetramethylene ether glycols, and the like, and mixtures thereof. Typically, the polyols have average hydroxyl functionalities from about 1 to about 8, and number average molecular weights from about 250 to about 25,000. Preferred polyether polyols have an average hydroxyl functionality within the range of about 2 to about 6, a hydroxyl number within the range of about 14 to about 260 mg KOH/g, and a number average molecular weight within the range of about 400 to about 12,000. Particularly preferred are polyoxypropylene diols and triols having a number average molecular weight from about 1000 to about 4000. Other examples of suitable polyols appear in U.S. Pat. No. 5,319,006, the teachings of which are incorporated herein by reference.

Suitable carboxylic acid derivatives are anhydrides, dicarboxylic acids, and diol diesters. Anhydrides useful in the process are cyclic anhydrides, which may be saturated or unsaturated. "Cyclic" anhydrides contain the anhydride functionality within a ring. Examples include phthalic anhydride and maleic anhydride. "Saturated" anhydrides contain no ethylenic unsaturation, but may contain aromatic rings. Examples include phthalic anhydride, propionic anhydride, trimellitic anhydride, and succinic anhydride. "Unsaturated" anhydrides contain ethylenic unsaturation that becomes incorporated into the polyetherester resin. Maleic anhydride is an example. Other examples of suitable anhydrides appear in U.S. Pat. No. 5,436,313, the teachings of which are incorporated herein by reference.

Dicarboxylic acids useful in the process are saturated or unsaturated. Preferred dicarboxylic acids are linear, branched, or cyclic $C_3$–$C_{40}$ aliphatic dicarboxylic acids and $C_6$–$C_{40}$ aromatic dicarboxylic acids. Examples include adipic acid, maleic acid, succinic acid, isophthalic acid, and the like, and mixtures thereof. Additional examples of suitable dicarboxylic acids appear in U.S. Pat. No. 5,436,314, the teachings of which are incorporated herein by reference.

Diol diesters useful in the process are reaction products of about 2 moles of a cyclic anhydride with about 1 mole of a diol. The diol diesters have two internal ester units, and two carboxylic acid end groups that result from ring opening of the cyclic anhydride. Suitable diol diesters can be made in other ways well known to those skilled in the art. For example, the diol can be esterified with a dicarboxylic acid or reacted with an acid halide. However, the anhydride route is most convenient. Preferred diol diesters have the general formula:

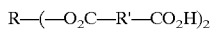

$$R\text{—}(\text{—}O_2C\text{—}R'\text{—}CO_2H)_2$$

in which R is a bivalent $C_2$–$C_{30}$ alkyl or aralkyl moiety derived from a diol, and R' is a bivalent $C_2$–$C_{20}$ alkyl or aryl moiety derived from a cyclic anhydride. Suitable diol diesters derive from $C_2$–$C_{30}$ diols, including, for example, ethylene glycol, propylene glycol, diethylene glycol, dipropylene glycol, triethylene glycol, tripropylene glycol, 2-methyl-1,3-propanediol, neopentyl glycol, 1,4-butanediol, 1,6-hexanediol, 1,4-benzenedimethanol, 1,4-cyclohexanedimethanol, bisphenol A, bisphenol F, alkoxylated bisphenols, and the like, and mixtures thereof. Preferred cyclic anhydrides from which the diol diesters derive are saturated or unsaturated $C_4$–$C_{20}$ cyclic anhydrides such as maleic anhydride, phthalic anhydride, itaconic anhydride, citraconic anhydride, and the like, and mixtures thereof. Additional examples of suitable diol diesters appear in U.S. Pat. No. 5,677,396, the teachings of which are incorporated herein by reference.

Suitable "insertion catalysts" are the ones previously described for inserting anhydrides, dicarboxylic acids, and diol diesters into polyethers. They include Lewis acids (e.g., zinc chloride, zinc bromide), protic acids that have a pKa less than about 0 (e.g., p-toluenesulfonic acid), and metal salts of the protic acids (e.g., zinc triflate). The catalyst is used in an amount effective to promote insertion of the carboxylic acid derivative into carbon-oxygen bonds of the polyether to produce a polyetherester resin. Suitable catalysts are described, for example, in U.S. Pat. Nos. 5,319,006, 5,436,313, 5,436,314, and 5,677,396, the teachings of which are incorporated herein by reference.

The polyether, carboxylic acid derivative, and insertion catalyst are heated under conditions effective to promote insertion of the carboxylic acid derivative at random into carbon-oxygen bonds of the polyether to produce a polyetherester resin. This step corresponds to the usual process for making a polyetherester resin as described in U.S. Pat. Nos. 5,319,006, 5,436,313, and 5,436,314, and 5,677,396. Some or all of the end groups of the polyetherester resin will be free carboxylic acid groups. The acid number of this resin is typically within the range of about 80 to about 120 mg KOH/g, preferably from about 90 to about 110 mg KOH/g, and most preferably from about 95 to about 105 mg KOH/g. While any desired reaction temperature can be used, it is preferred to perform this step at a temperature within the range of about 60° C. to about 300° C., more preferably from about 100° C. to about 250° C.

The unsaturated polyetherester resin is optionally reacted with a capping agent such as an alkylene oxide, glycol, primary diol, or epoxy compound. Reaction with the capping agent reduces the acid number of the resin. When the capping agent is a primary diol or a diepoxy compound, chain extension occurs and the number average molecular weight of the resin increases. The preferred amount of capping agent is that needed to produce the desired combination of hydroxyl number, number average molecular weight, viscosity, and acid number for use in making the thermoset, and is left to the discretion of those skilled in the art. Generally, however, if a capping agent is used it will be used in an amount within the range of about 0.1 to about 20 wt. % based on the amount of unsaturated polyetherester resin; a more preferred range is from about 0.5 to about 5 wt. %.

In the second step of the process of the invention, the unsaturated polyetherester resin is co-cured with a vinyl monomer and a di- or polyisocyanate. Vinyl monomers suitable for use in the invention are those well known in the art as valuable for making polyester thermosets. Examples include vinyl aromatic monomers, vinyl ethers, vinyl esters of carboxylic acids, acrylic and methacrylic acid esters, allyl esters of aromatic di- and polycarboxylic acids, and the like, and mixtures thereof. Specific examples include styrene, vinyl acetate, methyl methacrylate, diallyl phthalate, and the like. Styrene is preferred.

The amount of vinyl monomer needed depends on many factors, including the nature of the resin and vinyl monomer, the resin viscosity, the amount of isocyanate component used, the desired physical properties of the thermoset, and other factors. Generally, it is preferred to use the vinyl monomer in an amount within the range of about 15 to about 65 wt. % based on the amount of thermoset polymer; a more preferred range is from about 25 to about 50 wt. %.

A key component in the co-cure system is a di- or polyisocyanate. Aromatic, aliphatic, and cycloaliphatic di- and polyisocyanates are generally suitable for use. Thus, suitable di- and polyisocyanates include toluene diisocyanate (TDI), methylene diphenylene diisocyanates (MDIs), carbodiimide-modified MDIs (such as Mondur CD, a product of Bayer), polymeric MDIs, MDI variants, polymeric TDIs, hexamethylene diisocyanate (HDI), hydrogenated MDIs (H-MDIs), isophorone diisocyanate, cyclohexane diisocyanates, and the like, and mixtures thereof.

The amount of di- or polyisocyanate used depends on many factors, including the nature of the resin, isocyanate, and vinyl monomer, whether or not a blowing agent is included, the desired NCO/OH index, the desired physical properties of the thermoset, and other factors. Generally, however, it is preferred to use the di- or polyisocyanate in an amount within the range of about 1 to about 40 wt. % based on the amount of thermoset polymer; a more preferred range is from about 5 to about 20 wt. %. In general, the invention gives formulators a cost advantage over "pure" polyurethane systems because less of the typically expensive isocyanate component is needed to give a cured thermoset.

Co-cured thermosets of the invention are made by combining an unsaturated polyetherester resin made by insertion with a vinyl monomer and a di- or polyisocyanate according to methods generally used for making thermosets from unsaturated polyester resins. Typically, the resin, vinyl monomer, and isocyanate are combined with a free-radical initiator and a transition metal (preferably cobalt) promoter at room or elevated temperature, and the mixture is cured to give a solid product that may be post-cured, if desired, by heating at elevated temperature. Suitable free-radical initiators and promoters are well known in the art; examples appear in U.S. Pat. No. 5,319,006, the teachings of which are incorporated herein by reference. Two curing reactions occur simultaneously or in sequence: one mechanism links the vinyl monomer and resin via free-radical curing, while the other reacts hydroxyl or acid groups in the resin (and any added water) with the —NCO groups of the di- or polyisocyanate to form polyurethane/urea links. The thermosets of the invention can include fillers, glass fibers, pigments, or other additives or reinforcing materials.

In one aspect of the invention, one or more blowing agents are included in the formulation to produce a cellular or microcellular thermoset, such as a rigid foam. Other reactive diluents, such as low molecular weight polyols or amines (glycerin, trimethylolpropane, diethanolamine) can be included with the blowing agent. Suitable blowing agents include reactive blowing agents (such as water) and physical blowing agents (volatile hydrocarbons, CFCs, or the like). Example 28 below illustrates the preparation of a rigid foam thermoset made by co-curing an unsaturated polyetherester resin with styrene and a diisocyanate in the presence of a free-radical curing system and aqueous ammonia (reactive blowing agent).

An advantage of the co-cure system for making rigid foam is that only a relatively minor proportion of isocyanate (normally the most expensive major foam component) is needed: typically, 5–20 wt. % of di- or polyisocyanate suffices.

Co-cured thermosets of the invention offer surprising and valuable advantages. First, they provide excellent resistance to water and aqueous solutions (base, acid, etc.) while avoiding the need to use a diepoxy compound in the co-curing process. As the examples below show, the thermosets retain most of their strength and flexibility even after a seven-day exposure to boiling water, aqueous HCl, or aqueous KOH. Preferably, thermosets of the invention retain at least about 70%, more preferably at least about 80%, of their flexural strength following the standard seven-day water-boil test. In addition, the thermosets, which are based on unsaturated polyetherester resins, offer flexibility and strength property advantages over previously known hybrid resin systems based on polyester resins.

Moreover, the thermosets generally have higher DTULs than comparable thermosets made without the di- or polyisocyanate. Typically, the DTULs of the co-cured thermosets are about 10° F. to about 50° F. greater than the thermosets made without the di- or polyisocyanate.

The invention includes processes for making low-viscosity resins useful for making water-resistant thermosets. In one process, an unsaturated polyetherester resin intermediate is prepared by insertion as described. The resin intermediate is then reacted with a mono-functional isocyanate or a fatty alcohol to produce a low-viscosity capped resin. Capping resins with a mono-functional isocyanate or a fatty alcohol allows formulators to make water-resistant thermosets from low-viscosity resins. When a fatty alcohol is used as the capping agent, up to about 50 mole percent (based on the amount of fatty alcohol) of a glycol capping agent can be included in the capping step. Use of a mixture of glycol and fatty alcohol capping agents gives the formulator an added tool for regulating resin molecular weight and viscosity.

Mono-functional isocyanates have one (and only one) free —NCO group. Preferred mono-functional isocyanates have the general structure R—NCO, wherein R is a $C_4$ to $C_{50}$ aliphatic, aromatic, or cycloaliphatic moiety. Examples include phenyl isocyanate, benzyl isocyanate, naphthyl isocyanate, halophenyl or nitrophenyl isocyanates, and the like, and mixtures thereof.

Fatty alcohols have at least four carbons and a single —OH group. Preferred fatty alcohols are $C_4$–$C_{50}$ aliphatic, cycloaliphatic, and aromatic alcohols. Examples include tert-butyl alcohol, isobutyl alcohol, 2-ethylhexyl alcohol, cyclohexanol, 2-phenylethyl alcohol, benzyl alcohol, cyclopentyl alcohol, and the like, and mixtures thereof.

The relative amounts of mono-functional isocyanate or fatty alcohol and polyetherester resin intermediate used in the process depend on the desired resin viscosity and functionality, the nature of the resin, the nature of the isocyanate or alcohol, the desired DTUL of the thermoset, other thermoset physical properties, and other factors. Generally, it is preferred to react at least about 50%, more preferably at least about 80%, of the available reactive groups of the resin intermediate (hydroxyl or carboxylic acid groups) with the isocyanate or fatty alcohol.

We surprisingly found that capping an unsaturated polyetherester resin intermediate with a fatty alcohol or an isocyanate gives low-viscosity resins. This sets the resins apart from high-performance resins made by chain extension with, for example, a diepoxy compound, which usually have high viscosities that can limit the number of useful application areas. The capped resins of the invention preferably have viscosities less than about 250 cps at 26° C. and 60 wt. % solids, and more preferably less than about 150 cps at 26° C. and 60 wt. % solids.

Because they have low viscosities, the capped resins are easy to formulate, even at high solids levels, which makes them valuable for reducing VOC emissions. In addition, the resins cure by a free-radical mechanism to give thermosets with an excellent balance of physical properties, particularly high DTUL and good water resistance (see Examples 1 and 2 below). If desired, the capped resins can also be used in a co-cure system as described above provided that at least some of the hydroxyl or carboxylic acid groups remain for reaction with the di- or polyisocyanate.

In another process of the invention, an unsaturated polyetherester resin is reacted with an olefin in an amount and manner effective to give a low-viscosity resin. The method is essentially the same as that described above. Preferred olefins are $C_4$–$C_{50}$ olefins that can form ether adducts with the hydroxyl or carboxylic acid groups of the polyetherester resin. Suitable olefins include, for example, dicyclopentadiene, norbornene, cyclohexene, and the like, and mixtures thereof. Resins capped with an olefin offer the advantages described above for the resins capped with fatty alcohols or mono-functional isocyanates.

The following examples merely illustrate the invention. Those skilled in the art will recognize many variations that are within the spirit of the invention and scope of the claims.

EXAMPLE 1

Preparation of a Water-Resistant Polyetherester Resin and Thermoset

A thirty-gallon, stainless-steel reactor equipped with agitator, partial condenser, and nitrogen sparge tube is charged with a polyoxypropylene triol (3000 mol. wt., 104 lbs), maleic anhydride (83.6 lbs), propylene glycol (32.4 lbs) and p-toluenesulfonic acid (73 g). The mixture is heated to 205° C. with stirring and nitrogen sparging until the acid number dips to 90 mg KOH/g. More propylene glycol (3 lbs) and 2-ethylhexyl alcohol (28.7 lbs) are added, and the reaction continues until the acid number reaches 29 mg KOH/g. After cooling, the product is blended with styrene (40 wt. %). The resin has Mn=1246, Mw=3112, Mw/Mn=2.5. Viscosity (40% styrene solution, 26° C.): 70 cps.

The liquid resin is cured to a hard plastic by curing with cobalt naphthenate and MEKP using procedures well known in the art (see Example 3 for more details). The cured plastic has tensile strength=5850 psi, tensile elongation=3.8%, tensile modulus=354 kpsi, flexural strength=11.3 kpsi, flexural modulus=323 kpsi, and DTUL=184° F. To measure the cured product's water resistance, flex test bars are immersed in 100° C. distilled water for 6 days. The exposed bars have flexural strength=6.2 kpsi (55% retention).

EXAMPLE 2

Preparation of a Water-Resistant Polyetherester Resin and Thermoset

A reactor equipped as in Example 1 is charged with a polyoxypropylene triol (3000 mol. wt., 95 lbs), maleic anhydride (90.2 lbs), propylene glycol (35 lbs) and p-toluenesulfonic acid (73 g). The mixture is heated to 205° C. with stirring and nitrogen sparging until the acid number dips to 97 mg KOH/g. More propylene glycol (3 lbs) and 2-ethylhexyl alcohol (28.7 lbs) are added, and the reaction continues until the acid number reaches 29 mg KOH/g. After cooling, the product is blended with styrene (40 wt. %). The resin has Mn=1111, Mw=2814, Mw/Mn=2.5. Viscosity (40% styrene solution, 26° C.): 51 cps.

The liquid resin is cured to a hard plastic by curing with cobalt naphthenate and MEKP. The cured plastic has tensile strength=7000 psi, tensile elongation=3.7%, tensile modulus=378 kpsi, flexural strength=14.0 kpsi, flexural modulus=377 kpsi, and DTUL=213° F. To measure the cured product's water resistance, flex test bars are immersed in 100° C. distilled water for 6 days. The exposed bars have flexural strength=8.68 kpsi (62% retention).

EXAMPLE 3 and COMPARATIVE EXAMPLE 4

Preparation of a Co-cured Thermoset

An unsaturated polyetherester resin is prepared from a 3000 mol. wt. polyoxypropylene triol, maleic anhydride (35 wt. % based on the amount of resin), and propylene glycol as described in U.S. Pat. No. 5,436,313. The final acid number of the resin is 30 mg KOH/g. The resin is diluted to 45 wt. % styrene content, and is then combined with Mondur CD isocyanate (carbodiimide-modified MDI, product of Bayer, 5.5 wt. % based on the amount of resin), 0.2 wt. % of cobalt naphthenate solution (6% active cobalt), and 1.25 wt. % of DDM-9 initiator (MEK peroxide in mineral oil containing 9% active oxygen, product of Atochem), and is degassed and allowed to cure at room temperature for 16 h. The resulting thermoset product is post-cured at 100° C. for 5 h.

Comparative Example 4 is prepared as described above except that the Modur CD isocyanate is omitted. As Table 1 shows, the thermoset system co-cured with isocyanate has improved tensile strength compared with the conventional thermoset. In addition, the table shows that the co-cured thermoset has excellent water resistance as flexural strength and flexural modulus are affected very little by a 7-day exposure to boiling aqueous solutions (water, 5% aq. HCl, 5% aq. KOH). As noted in the table, the samples prepared in the absence of the isocyanate degraded significantly during exposure to boiling aqueous solutions; consequently, their mechanical properties could not be measured thereafter.

EXAMPLES 5–6 and COMPARATIVE EXAMPLE 7

Preparation of a Co-cured Thermoset

A polyetherester resin is prepared from ACCLAIM 4200 diol (a 4000 mol. wt. polyoxypropylene diol having low unsaturation, available from ARCO Chemical, 5141 g), maleic anhydride (3500 g, 35 wt. % based on the amount of resin), propylene glycol (1359 g), 2-methyl-1,3-propanediol (1440 g), and p-toluenesulfonic acid (7.5 g) by generally following the method of Example 1 of U.S. Pat. No. 5,696,225. (The 2-methyl-1,3-propanediol is added at 190° C. when the resin acid number reaches 90 mg KOH/g.) The hydroxyl number of the resin (at 30 wt. % styrene content) is 56 mg KOH/g. The final acid number (30 wt. % styrene) is 1.8 mg KOH/g.

The resin is diluted to 45 wt. % styrene content, and is then combined with a 10–13 wt. % of a diisocyanate (see Table 2), 0.2 wt. % of cobalt naphthenate solution (6% active cobalt), and 1.25 wt. % of DDM-9 initiator, and is allowed to cure at room temperature for 16 h. The resulting thermoset product is post-cured at 100° C. for 5 h.

Comparative Example 7 is prepared as described above except that the diisocyanate is omitted. As Table 2 shows, the isocyanate co-cured thermoset system has higher DTUL, tensile strength, modulus, and elongation compared with the conventional thermoset. In addition, the table shows that the co-cured thermoset retains a much higher percentage of its flexural strength following 7-day immersion in boiling aqueous solutions.

EXAMPLES 8–11 and COMPARATIVE EXAMPLE 12

Preparation of a Co-cured Thermoset

An unsaturated polyetherester resin is prepared from a 3000 mol. wt. polyoxypropylene triol, maleic anhydride (30 wt. % based on the amount of resin), and propylene glycol as described in U.S. Pat. No. 5,436,313. The resin is diluted to 40 wt. % styrene content, and is then combined with Mondur CD isocyanate (5–20 wt. % based on the amount of resin), 0.2 wt. % of cobalt naphthenate solution (6% active cobalt), and 1.25 wt. % of DDM-9 initiator, and is degassed and allowed to cure at room temperature for 16 h. The resulting thermoset product is post-cured at 100° C. for 5 h.

Comparative Example 12 is prepared as described above except that the Modur CD isocyanate is omitted. As Table 3 shows, co-curing with isocyanate increases the DTUL and tensile strength of the thermoset compared with the control example in which no isocyanate is used. Retention of flexural strength following exposure to boiling aqueous solutions also improves with isocyanate co-curing.

EXAMPLES 13–16 and COMPARATIVE EXAMPLE 17

Preparation of a Co-cured Thermoset

An unsaturated polyetherester resin is prepared from a 3000 mol. wt. polyoxypropylene triol, maleic anhydride (40 wt. % based on the amount of resin), and propylene glycol as described in U.S. Pat. No. 5,436,313. The resin is diluted to 40 wt. % styrene content, and is then combined with Mondur CD isocyanate (5–20 wt. % based on the amount of resin), 0.2 wt. % of cobalt naphthenate solution (6% active cobalt), and 1.25 wt. % of DDM-9 initiator, and is degassed and allowed to cure at room temperature for 16 h. The resulting thermoset product is post-cured at 100° C. for 5 h.

Comparative Example 17 is prepared as described above except that the Modur CD isocyanate is omitted. As Table 4 shows, co-curing with isocyanate increases the DTUL and tensile strength of the thermoset compared with the control example in which no isocyanate is used. Retention of flexural strength following exposure to boiling aqueous solutions also improves dramatically with isocyanate co-curing.

EXAMPLES 18–21 and COMPARATIVE EXAMPLE 22

Preparation of a Co-cured Thermoset

An unsaturated polyetherester resin is prepared from a 3000 mol. wt. polyoxypropylene triol, maleic anhydride (35 wt. % based on the amount of resin), and propylene glycol as described in U.S. Pat. No. 5,436,313. The resin is diluted to 40 wt. % styrene content, and is then combined with toluene diisocyanate (80/20 mixture of 2,4- and 2,6-isomers, 5–20 wt. % based on the amount of resin), 0.2 wt. % of cobalt naphthenate solution (6% active cobalt), and 1.25 wt. % of DDM-9 initiator, and is allowed to cure at room temperature for 16 h. The resulting thermoset product is post-cured at 100° C. for 5 h.

Comparative Example 22 is prepared as described above except that the TDI is omitted. As Table 5 shows, co-curing with isocyanate increases the tensile strength of the thermoset compared with the control example in which no isocyanate is used. Retention of flexural strength following exposure to boiling aqueous solutions also improves dramatically with isocyanate co-curing.

EXAMPLES 23–26 and COMPARATIVE EXAMPLE 27

Preparation of a Co-cured Thermoset

An unsaturated polyetherester resin is prepared from a 3000 mol. wt. polyoxypropylene triol, maleic anhydride (25 wt. % based on the amount of resin), and propylene glycol as described in U.S. Pat. No. 5,436,313. The resin is diluted to 40 wt. % styrene content, and is then combined with hexamethylene diisocyanate (5–20 wt. % based on the amount of resin), 0.2 wt. % of cobalt naphthenate solution (6% active cobalt), and 1.25 wt. % of DDM-9 initiator, and is allowed to cure at room temperature for 16 h. The resulting thermoset product is post-cured at 100° C. for 5 h.

Comparative Example 27 is prepared as described above except that the hexamethylene diisocyanate is omitted. As Table 6 shows, co-curing with isocyanate increases the DTUL and tensile strength of the thermoset compared with the control example in which no isocyanate is used.

EXAMPLE 28

Preparation of a Co-Cured Rigid Foam from an Polyetherester Resin

A one-liter plastic flask is charged with an unsaturated polyetherester resin (60 g) prepared as in Example 3. Styrene (40 g) is added and mixed well, followed by DC-193 surfactant (product of Dow Corning, 0.5–1.0 g), Nuodex cobalt octoate (6% active Co, 0.1–0.3 g, product of Hüls), toluene diisocyanate (80/20 mixture of isomers, 5–20 g), and MEKP initiator (1–2 g). Efficient mixing follows addition of each component. With the agitator on, aqueous ammonia (2–3 g) is rapidly added and mixed. The mixture is immediately poured into a mold and allowed to cure. The product is a rigid foam having a density of about 4–6 lb./ft$^3$. The foam adheres well to wood, metal, and other common substrates, making it useful for flotation devices and "sandwich" structural boards.

The preceding examples merely illustrate the invention; the following claims define the scope of the invention.

TABLE 1

Physical Properties of Co-Cured Thermosets

| Example # | 3 | C4 |
|---|---|---|
| % MAn in Resin | 35 | 35 |
| Wt. % of Mondur CD | 5.5 | 0 |
| DTUL (° F.) | 237 | 227 |
| Tensile strength (psi) | 8300 | 7370 |

TABLE 1-continued

Physical Properties of Co-Cured Thermosets

| Example # | 3 | C4 |
|---|---|---|
| Elongation (%) | 3.3 | 3.2 |
| Flex strength 5% (kpsi) | | |
| before | 16.1 | 15.0 |
| after 7 - day H₂O boil | 14.6 | * |
| after 7 - day KOH boil | 15.8 | * |
| after 7 - day HCl boil | 15.0 | * |
| Flex modulus (kpsi) | | |
| before | 431 | 406 |
| after 7 - day H₂O boil | 417 | * |
| after 7 - day KOH boil | 417 | * |
| after 7 - day HCl boil | 419 | * |

*Sample degraded significantly during boiling tests; therefore, mechanical properties could not be tested.

TABLE 2

Physical Properties of Co-Cured Thermosets

| Example # | 5 | 6 | C7 |
|---|---|---|---|
| % MAn in Resin | 35 | 35 | 35 |
| Wt. % of Isocyanate | 10% Mondur CD | 13% HDI | 0 |
| DTUL (° F.) | 211 | 179 | 177 |
| Tensile strength (psi) | 8610 | 8230 | 6520 |
| Elongation (%) | 5.4 | 5.4 | 3.8 |
| Flex strength 5% (kpsi) | | | |
| before | 15.7 | 14.1 | 12.2 |
| after 7 - day H₂O boil | 15.0 | 13.1 | 6.1 |
| after 7 - day KOH boil | 15.4 | 14.5 | 10.9 |
| after 7 - day HCl boil | 11.6 | 13.0 | 4.2 |
| Flex modulus (kpsi) | | | |
| before | 410 | 369 | 345 |
| after 7 - day H₂O boil | 409 | 389 | 356 |
| after 7 - day KOH boil | 410 | 394 | 317 |
| after 7 - day HCl boil | 405 | 390 | 321 |

TABLE 3

Physical Properties of Co-Cured Thermosets

| Example # | 8 | 9 | 10 | 11 | C12 |
|---|---|---|---|---|---|
| % MAn in Resin | 30 | 30 | 30 | 30 | 30 |
| Wt. % of Mondur CD | 5 | 10 | 15 | 20 | 0 |
| DTUL (° F.) | 175 | 196 | 210 | 199 | 162 |
| Tensile strength (psi) | 6580 | 7050 | 7600 | 7950 | 5340 |
| Elongation (%) | 6.7 | 5.8 | 3.9 | 3.0 | 6.3 |
| Flex strength 5% (kpsi) | | | | | |
| before | 11.3 | 12.1 | 14.3 | 13.7 | 9.4 |
| after 7 - day H₂O boil | 10.4 | 11.9 | 12.6 | 13.0 | 7.3 |
| after 7 - day KOH boil | 10.8 | 12.2 | 12.9 | 14.1 | 8.4 |
| after 7 - day HCl boil | 9.5 | 11.1 | 11.1 | 10.7 | 6.8 |
| Flex modulus (kpsi) | | | | | |
| before | 327 | 344 | 388 | 415 | 276 |
| after 7 - day H₂O boil | 298 | 328 | 350 | 359 | 253 |
| after 7 - day KOH boil | 294 | 337 | 351 | 365 | 243 |
| after 7 - day HCl boil | 286 | 333 | 347 | 354 | 246 |

TABLE 4

Physical Properties of Co-Cured Thermosets

| Example # | 13 | 14 | 15 | 16 | C17 |
|---|---|---|---|---|---|
| % MAn in Resin | 40 | 40 | 40 | 40 | 40 |
| Wt. % of Mondur CD | 5 | 10 | 15 | 20 | 0 |
| DTUL (° F.) | 234 | 241 | 252 | 262 | 230 |
| Tensile strength (psi) | 9200 | 9470 | 8740 | 7510 | 6500 |
| Elongation (%) | 3.8 | 3.7 | 2.6 | 1.7 | 2.1 |
| Flex strength 5% (kpsi) | | | | | |
| before | 17.2 | 15.9 | 17.7 | 19.7 | 14.6 |
| after 7 - day H₂O boil | 12.2 | 15.9 | 17.1 | 18.1 | 7.6 |
| after 7 - day KOH boil | 14.3 | 17.7 | 17.5 | 18.2 | 12.0 |
| after 7 - day HCl boil | 11.2 | 14.2 | 12.8 | 10.8 | 6.1 |
| Flex modulus (kpsi) | | | | | |
| before | 451 | 457 | 458 | 489 | 417 |
| after 7 - day H₂O boil | 429 | 462 | 462 | 469 | 369 |
| after 7 - day KOH boil | 412 | 446 | 466 | 462 | 342 |
| after 7 - day HCl boil | 432 | 455 | 471 | 468 | 364 |

TABLE 5

Physical Properties of Co-Cured Thermosets

| Example # | 18 | 19 | 20 | 21 | C22 |
|---|---|---|---|---|---|
| % MAn in Resin | 35 | 35 | 35 | 35 | 35 |
| Wt. % of TDI | 5 | 10 | 15 | 20 | 0 |
| DTUL (° F.) | 242 | 243 | 204 | 179 | 228 |
| Tensile strength (psi) | 6790 | 7650 | 7250 | 7220 | 5720 |
| Elongation (%) | 2.4 | 2.1 | 1.5 | 1.6 | 2.2 |
| Flex strength 5% (kpsi) | | | | | |
| before | 14.9 | 15.8 | 18.0 | 18.7 | 14.1 |
| after 7 - day H₂O boil | 12.8 | 13.4 | 16.0 | 13.6 | 6.8 |
| after 7 - day KOH boil | 13.7 | 15.8 | 16.6 | 16.9 | 11.0 |
| after 7 - day HCl boil | 9.9 | 8.3 | 7.0 | 7.1 | 6.1 |

TABLE 5-continued

Physical Properties of Co-Cured Thermosets

| Example # | 18 | 19 | 20 | 21 | C22 |
|---|---|---|---|---|---|
| Flex modulus (kpsi) | | | | | |
| before | 427 | 459 | 505 | 531 | 380 |
| after 7 - day H$_2$O boil | 380 | 434 | 468 | 475 | 334 |
| after 7 - day KOH boil | 350 | 422 | 459 | 471 | 315 |
| after 7 - day HCl boil | 368 | 406 | 429 | 455 | 314 |

TABLE 6

Physical Properties of Co-Cured Thermosets

| Example # | 23 | 24 | 25 | 26 | C27 |
|---|---|---|---|---|---|
| % MAn in Resin | 25 | 25 | 25 | 25 | 25 |
| Wt. % of HDI | 5 | 10 | 15 | 20 | 0 |
| DTUL (° F.) | 109 | 114 | 117 | 119 | 107 |
| Tensile strength (psi) | 2600 | 2960 | 3320 | 3630 | 2290 |
| Elongation (%) | 23 | 16 | 21 | 20 | 17 |
| Flex strength 5% (kpsi) | | | | | |
| before | 4.3 | 5.0 | 5.6 | 6.3 | 3.7 |
| after 7 - day H$_2$O boil | 4.8 | 5.4 | 6.1 | 6.9 | 4.1 |
| after 7 - day KOH boil | 5.0 | 5.6 | 6.6 | 6.9 | 4.3 |
| after 7 - day HCl boil | 4.9 | 5.3 | 6.2 | 6.6 | 4.3 |
| Flex modulus (kpsi) | | | | | |
| before | 123 | 139 | 160 | 177 | 106 |
| after 7 - day H$_2$O boil | 143 | 160 | 180 | 192 | 126 |
| after 7 - day KOH boil | 148 | 164 | 184 | 190 | 134 |
| after 7 - day HCl boil | 144 | 154 | 172 | 178 | 132 |

We claim:

1. A process for making a polyetherester thermoset, said process comprising:
   (a) reacting a polyether with a carboxylic acid derivative selected from the group consisting of anhydrides, dicarboxylic acids, and diol diesters in the presence of an insertion catalyst under conditions effective to promote insertion of the carboxylic acid derivative into carbon-oxygen bonds of the polyether to produce an unsaturated polyetherester resin; and
   (b) co-curing the resin with a vinyl monomer and a di- or polyisocyanate to produce a polyetherester thermoset.

2. The process of claim 1 wherein the polyether polyol has an avererage hydroxyl functionality within the range of about 2 to about 6, a hydroxyl number within the range of about 14 to about 260 mg KOH/g, and number average molecular weight within the range of about 400 to about 12,000.

3. The process of claim 1 wherein the insertion catalyst is selected from the group consisting of Lewis acids, protic acids that have a pKa less than about 0, and metal salts of the protic acids.

4. The process of claim 1 wherein step (a) is performed at a temperature within the range of about 60° C. to about 300° C.

5. The process of claim 1 wherein the vinyl monomer is selected from the group consisting of vinyl aromatic monomers, vinyl ethers, vinyl esters of carboxylic acids, acrylic and methacrylic acid esters, allyl esters of aromatic di- and polycarboxylic acids, and mixtures thereof.

6. The process of claim 1 wherein the di- or polyisocyanate is selected from the group consisting of toluene diisocyanates, methylene diphenylene diisocyanates (MDIs), polymeric MDIs, MDI variants, carbodiimide-modified MDIs, isophorone diisocyanate, polymeric TDIs, cyclohexane diisocyanates, hydrogenated MDIs, aliphatic diisocyanates, and mixtures thereof.

7. The process of claim 1 wherein the polyetherester thermoset retains at least about 80% of its flexural strength after the seven-day water-boil test.

8. The process of claim 1 wherein prior to step (b), the resin is reacted with a capping agent selected from the group consisting of alkylene oxides, glycols, primary diols, and epoxy compounds.

9. The process of claim 1 wherein step (b) is performed in the presence of one or more blowing agents to produce a cellular or microcellular polyetherester thermoset.

10. The process of claim 9 wherein the diisocyanate is toluene diisocyanate, and step (b) is performed in the presence of aqueous ammonia.

11. A polyetherester thermoset made by the process of claim 1.

12. The process of claim 1 wherein the thermoset has a higher DTUL compared with a comparable thermoset prepared in the absence of the di- or polyisocyanate.

13. A process which comprises:
    (a) reacting a polyether with a carboxylic acid derivative selected from the group consisting of anhydrides, dicarboxylic acids, and diol diesters in the presence of an insertion catalyst under conditions effective to promote insertion of the carboxylic acid derivative into carbon-oxygen bonds of the polyether to produce an unsaturated polyetherester resin intermediate; and
    (b) reacting the resin intermediate with a mono-functional isocyanate in an amount and manner effective to produce a capped resin that has a viscosity less than about 250 cps at 26° C. and 60 wt. % solids.

14. The process of claim 13 wherein the monofunctional isocyanate is selected from the group consisting of C$_4$–C$_{50}$ aromatic, aliphatic, and cycloaliphatic isocyanates.

15. The process of claim 13 further comprising reacting the capped resin with a vinyl monomer to produce a polyetherester thermoset.

16. A process which comprises:
    (a) reacting a polyether with a carboxylic acid derivative selected from the group consisting of anhydrides, dicarboxylic acids, and diol diesters in the presence of an insertion catalyst under conditions effective to promote insertion of the carboxylic acid derivative into carbon-oxygen bonds of the polyether to produce an unsaturated polyetherester resin intermediate; and
    (b) reacting the resin intermediate with a mono-functional fatty alcohol in an amount and manner effective to produce a capped resin that has a viscosity less than about 250 cps at 26° C. and 60 wt. % solids.

17. The process of claim 16 wherein the capped resin is further reacted with a vinyl monomer to give a polyetherester thermoset.

18. The process of claim 16 wherein step (b) is performed in the presence of up to about 50 mole percent, based on the amount of mono-functional fatty alcohol, of a glycol capping agent.

19. A process which comprises:

(a) reacting a polyether with a carboxylic acid derivative selected from the group consisting of anhydrides, dicarboxylic acids, and diol diesters in the presence of an insertion catalyst under conditions effective to promote insertion of the carboxylic acid derivative into carbon-oxygen bonds of the polyether to produce an unsaturated polyetherester resin intermediate; and (b) reacting the resin intermediate with a mono-functional olefin in an amount and manner effective to produce a capped resin that has a viscosity less than about 250 cps at 26° C. and 60 wt. % solids.

* * * * *